United States Patent
Lembo et al.

(10) Patent No.: US 12,055,256 B2
(45) Date of Patent: Aug. 6, 2024

(54) STATIC REDUCTION LOOSEFILL INSULATION HOSE AND STATIC REDUCTION LOOSEFILL INSULATION INSTALLATION SYSTEM

(71) Applicant: CertainTeed LLC, Malvern, PA (US)

(72) Inventors: Michael J. Lembo, Souderton, PA (US); Bruce Hartzell, Mickleton, NJ (US)

(73) Assignee: CertainTeed LLC, Malvern, PA (US)

( * ) Notice: Subject to any disclaimer, the term of this patent is extended or adjusted under 35 U.S.C. 154(b) by 319 days.

(21) Appl. No.: 17/701,211

(22) Filed: Mar. 22, 2022

(65) Prior Publication Data

US 2022/0307640 A1  Sep. 29, 2022

Related U.S. Application Data

(60) Provisional application No. 63/164,911, filed on Mar. 23, 2021.

(51) Int. Cl.
| | |
|---|---|
| *F16L 55/00* | (2006.01) |
| *F16L 11/00* | (2006.01) |
| *F16L 25/01* | (2006.01) |
| *F16L 59/04* | (2006.01) |
| *E04F 21/08* | (2006.01) |

(52) U.S. Cl.
CPC ............... *F16L 55/00* (2013.01); *F16L 11/00* (2013.01); *F16L 25/01* (2013.01); *F16L 59/04* (2013.01); *E04F 21/085* (2013.01)

(58) Field of Classification Search
None
See application file for complete search history.

(56) References Cited

U.S. PATENT DOCUMENTS

| | | | | |
|---|---|---|---|---|
| 2,834,059 | A | * | 5/1958 | Hoelzel ................ B65G 53/521 |
| | | | | 52/749.1 |
| 4,866,565 | A | * | 9/1989 | Wray, Jr. ................... H05F 3/02 |
| | | | | 361/220 |
| 6,336,474 | B1 | | 1/2002 | Kelley et al. |
| 6,503,026 | B1 | | 1/2003 | Mitchell |

(Continued)

FOREIGN PATENT DOCUMENTS

| | | |
|---|---|---|
| CA | 2797316 A1 | 6/2013 |
| FR | 2339038 A1 | 8/1977 |
| WO | 2019/211559 A1 | 11/2019 |

*Primary Examiner* — William R Harp
(74) *Attorney, Agent, or Firm* — McDonnell Boehnen Hulbert & Berghoff LLP

(57) ABSTRACT

The present disclosure relates generally to loose fill insulation installation systems, for example, suitable for installing loose fill insulation to an installation site. The present disclosure relates more particularly to a loose fill insulation hose including a first hose section, a second hose section and a first connection module including a first side attached to a distal end of the first hose section and a second side attached to a proximal end of the second hose section. The first connection module includes an interior surface including a conductive area. The loose fill insulation hose also includes a grounding wire electrically connected to the conductive area of the interior surface of the first connection module. The grounding wire is electrically isolated from the internal surface of the first hose section and the internal surface of the second hose section.

16 Claims, 7 Drawing Sheets

(56) References Cited

U.S. PATENT DOCUMENTS

| | | |
|---|---|---|
| 6,648,022 B2 | 11/2003 | Pentz et al. |
| 6,684,907 B2 | 2/2004 | Yang et al. |
| 6,719,864 B2 | 4/2004 | Kelley et al. |
| 6,732,960 B2 | 5/2004 | Shaw et al. |
| 7,284,573 B2 | 10/2007 | Wagner et al. |
| 7,520,935 B2 | 4/2009 | Fellinger |
| 9,334,661 B2 | 5/2016 | Lavallee, II et al. |
| 10,259,001 B2 | 4/2019 | Zhang et al. |
| 2003/0057142 A1 | 3/2003 | Pentz et al. |
| 2006/0163763 A1 | 7/2006 | Fellinger |
| 2013/0141832 A1 | 6/2013 | Fellinger |
| 2015/0143774 A1 | 5/2015 | Downey et al. |
| 2017/0073982 A1 | 3/2017 | Cook et al. |
| 2019/0240685 A1 | 8/2019 | Zhang et al. |
| 2021/0230864 A1 | 7/2021 | Azevedo et al. |

\* cited by examiner

STATIC REDUCTION LOOSEFILL INSULATION HOSE AND STATIC REDUCTION LOOSEFILL INSULATION INSTALLATION SYSTEM

BACKGROUND OF THE DISCLOSURE

1. Field of the Disclosure

The present disclosure relates generally to loose fill insulation installation systems, for example, suitable for installing loose fill insulation to an installation site. The present disclosure relates more particularly to a loose fill insulation hose operable to deliver loose fill insulation from an insulation blowing machine.

2. Technical Background

Loose fill insulation is packaged in bags in which the material becomes compacted prior to storage and shipment. When removed from the bags, the insulation separates into clumps. In order to effectively install the insulation material, it is initially conditioned to increase its volume and to reduce its density. Traditionally, pneumatic devices are used to both install the insulation and perform the conditioning. The conditioning process breaks up clumps and extends the fibers so as to "open up' the insulation, conditioning the fiber to a more flake-like form. The conditioned insulation is then applied pneumatically to an area by blowing it through a hose connected to the pneumatic device. The insulation may be moistened and/or treated with an adhesive in the pneumatic device before installation.

While existing systems for installing loose fill insulation are effective, the present inventors have identified certain aspects of these systems that can be improved.

SUMMARY OF THE DISCLOSURE

In one aspect, the present disclosure provides a loose fill insulation hose comprising:
  a first hose section including a proximal end and a distal end, the first hose section comprising a first tubular body extending from the proximal end to the distal end and having an internal surface surrounding a first conduit and an external surface;
  a second hose section including a proximal end and a distal end, the second hose section comprising a second tubular body extending from the proximal end to the distal end and having an internal surface surrounding a second conduit and an external surface;
  a first connection module including a first side attached to the distal end of the first hose section and a second side attached to the proximal end of the second hose section, the first connection module including an interior surface surrounding a path that connects the first conduit of the first hose section to the second conduit of the second hose section, the interior surface including a conductive area; and
  a grounding wire electrically connected to the conductive area of the interior surface of the first connection module, wherein the internal surface of the first tubular body is electrically isolated from the grounding wire along the length of the first hose section, and wherein the internal surface of the second tubular body is electrically isolated from the grounding wire along the length of the second hose section.

In another aspect, the disclosure provides a system for delivering loose fill insulation, the system comprising:
  a loose fill insulation blowing machine comprising:
    a hopper configured to receive loose fill insulation,
    an outlet, and
    a blower operable to expel loose fill insulation through the outlet; and
  a loose fill insulation hose according to the disclosure attached to the outlet of the loose fill insulation blowing machine.

In another aspect, the disclosure provides a method of delivering loose fill insulation to an installation site using the system according to the disclosure, the method comprising:
  expelling loose fill insulation from a blowing machine into the loose fill insulation hose;
  conveying the loose fill insulation through the loose fill insulation hose to the installation site; and
  discharging static charge from loose fill insulation passing through the first connection module via the grounding wire.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a pad of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have noted that static charge builds in loose fill insulation as it is delivered from a loose fill insulation blowing machine. This static charge can build and unexpectedly discharge causing discomfort or possibly injury to an installer.

Accordingly, one aspect of the disclosure is a loose fill insulation hose that includes a first hose section, a second hose section, and a first connection module. The first hose section includes a proximal end, a distal end and a first tubular body extending from the proximal end to the distal end. The first hose section has an internal surface surrounding a first conduit and an external surface. The second hose section also includes a proximal end, a distal end, and a second tubular body extending from the proximal end to the distal end. The second hose section has an internal surface that surrounds a second conduit and an external surface. The first connection module includes a first side that is attached to the distal end of the first hose section and a second side attached to the proximal end of the second hose section. The first connection module includes an interior surface that surrounds a path connecting the first conduit of the first hose section to the second conduit of the second hose section. The interior surface of the first connection module includes a conductive area. A grounding wire is electrically connected to the conductive area of the interior surface of the first connection module in order to discharge static charge within loose fill insulation passing through the first connection module. Further, the internal surface of the first tubular body is electrically isolated from the grounding wire along the length of the first hose section and the internal surface of the second tubular body is electrically isolated from the grounding wire along the length of the second hose section.

Figure 1:
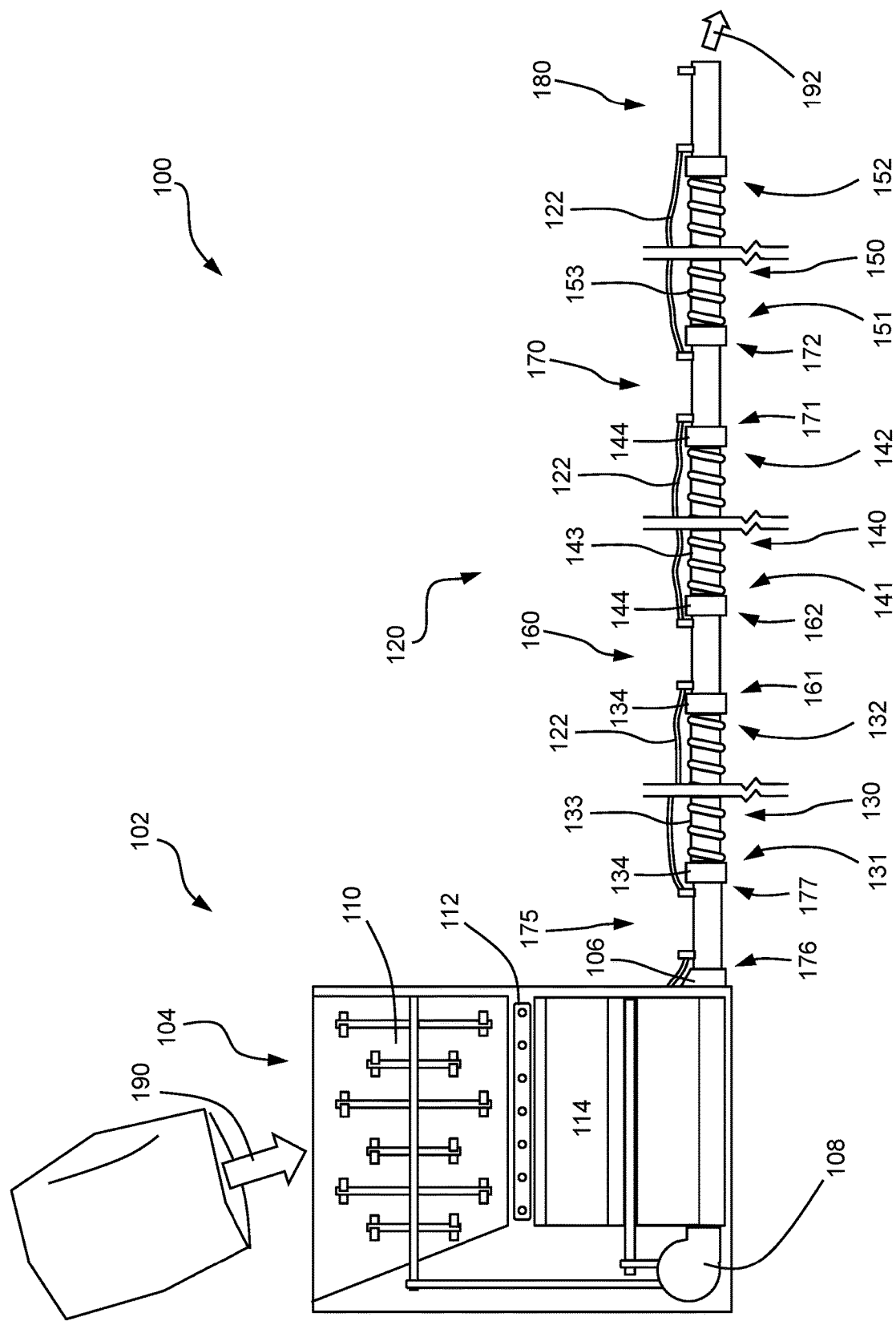
FIG. 1 is a schematic side view of a loose fill insulation system according to an embodiment of the disclosure.
Figure 2:
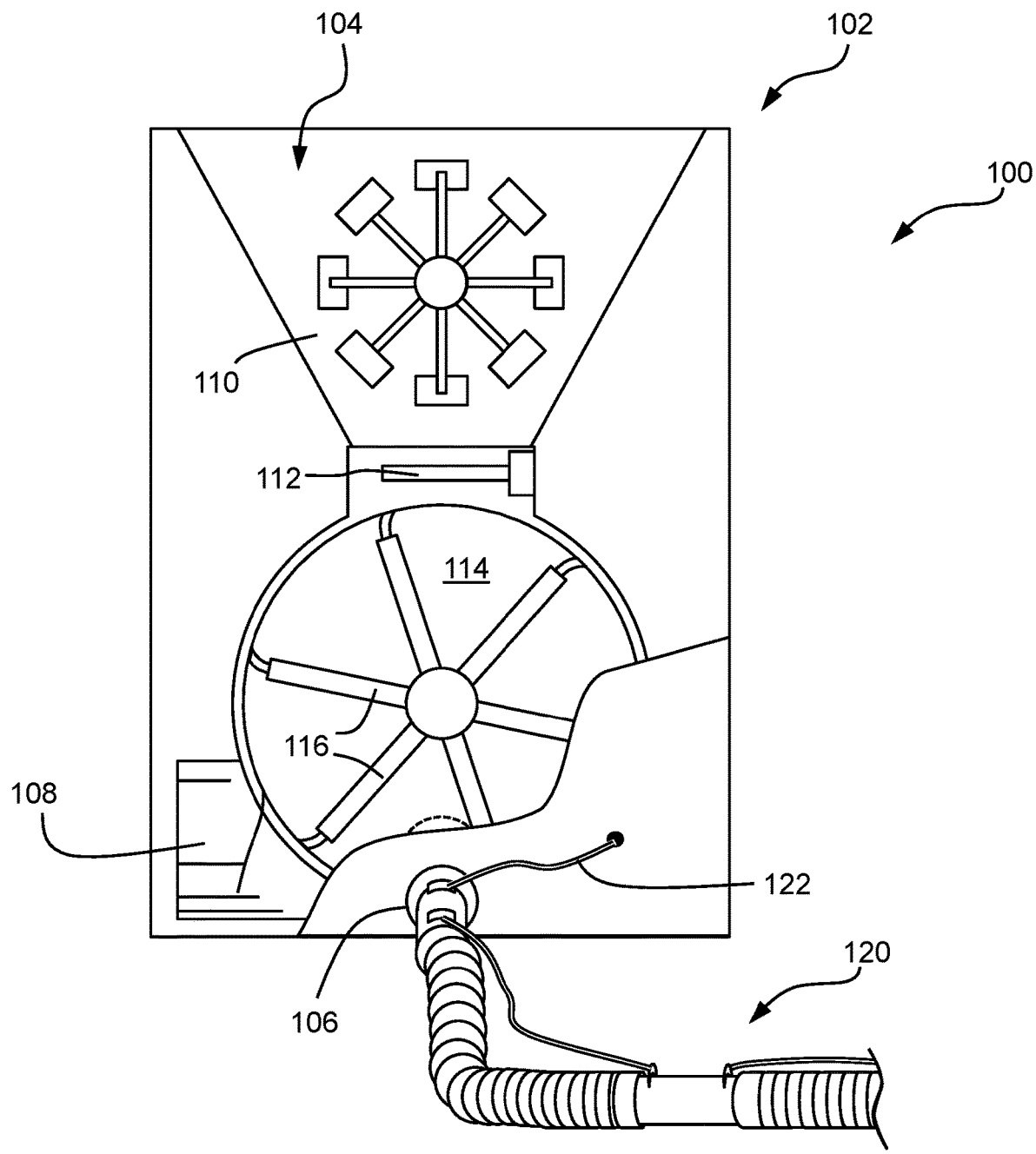
FIG. 2 is a schematic front view of the loose fill insulation system of FIG. 1.

Such a loose fill insulation hose is schematically shown in FIGS. 1 and 2 as part of a loose fill insulation system. Loose fill insulation hose 120 includes a first hose section 130, a second hose section 140 and a first connection module 160 between first hose section 130 and second hose section 140. First hose section 130 includes a proximal end 131 that is closest to a loose fill insulation blowing machine 102 and a distal end 132 that is attached to connection module 160. A first tubular body 133 of the first hose section 130 extends between opposing end fittings 134. Similar to first hose section 130, second hose section 140 also includes a proximal end 141, a distal end 142 and a second tubular body 143 extending from proximal end 141 to distal end 142. Further, second hose section 140 also includes end fittings 144 for connecting second hose section 140 to other components. A grounding wire 122 is coupled to first connection module 160 in order to remove static charge from loose fill insulation passing through the hose.

Figure 3:
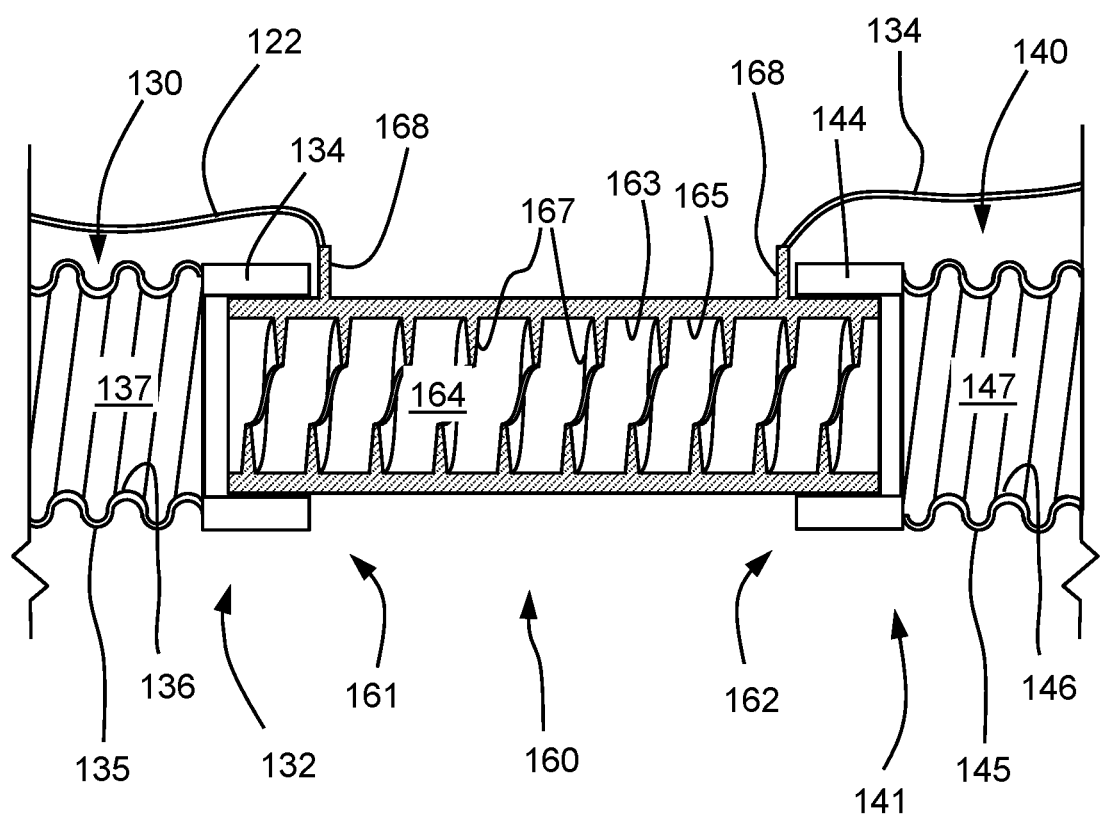
FIG. 3 is a schematic cross-sectional view of a portion of the loose fill insulation hose of the system of FIG. 1.

FIG. 3 shows a detailed cross section of a portion of first hose section 130, second hose section 140, and first connection module 160. As shown in FIG. 3, the first tubular body 133 of first hose section 130 includes an external surface 135 and an internal surface 136 that surrounds a first conduit 137 through which the loose fill insulation is carried. Likewise, the second tubular body 143 of second hose section 140 also has an internal surface 146 that surrounds a second conduit 147 and an external surface 145. The first connection module 160 includes a first side 161 that is attached to distal end 132 of first hose section 130 and a second side 162 that is attached proximal end 141 of second hose section 140. First connection module 160 includes an interior surface 163 that surrounds a path 164 connecting first conduit 137 to second conduit 147. The interior surface 163 of first connection module 160 includes a conductive area 165 that covers the entire interior surface 163. The grounding wire 122 is electrically connected to conductive area 165 of first connection module 160. However, the internal surface 136 of first tubular body 133 and the internal surface 146 of second tubular body 143 are both electrically isolated from grounding wire 122 along the length of the respective hose sections 130, 140.

The description of the internal surfaces of the tubular bodies as being electrically isolated from the grounding wire along the length of the hose sections, as set forth herein, refers to the absence of a conductive path running along the length of the tubular bodies that is electrically coupled to the grounding wire. Thus, the internal surface of the tubular bodies may either be entirely formed of an electrically insulating material so that the internal surface does not conduct charge to the connection module, or the internal surface may include some conductive areas so long as they do not conduct charge along the length of the hose section to the grounding wire.

While hose sections 130 and 140 of loose fill insulation hose 120 each include end fittings 134, 144, in other embodiments, the hose sections do not include end fittings. For example, in some embodiments, the hose sections have a consistent structure along their entire length, and an end portion of this structure is directly secured to the connection module(s).

In certain embodiments of the loose fill insulation hose as otherwise described herein, the loose fill insulation module further comprises a third hose section including a proximal end and a distal end, where the third hose section comprises a third tubular body extending from the proximal end to the distal end and having an internal surface surrounding a third conduit and an external surface. The loose fill insulation hose also includes a second connection module including a first side attached to the distal end of the second hose section and a second side attached to the proximal end of the third hose section. The second connection module includes an interior surface surrounding a path that connects the second conduit of the second hose section to the third conduit of the third hose section. The interior surface of the second connection module includes a conductive area that is electrically connected to the grounding wire.

For example, loose fill insulation hose 120, shown in FIGS. 1 and 2, includes a third hose section 150 with a proximal end 151 and a distal end 152. Third hose section 150 also includes a third tubular body 153 that extends from proximal end 151 to distal end 152. Similar to first tubular body 133 and second tubular body 143, as shown in FIG. 3, third tubular body also includes an internal surface that surrounds a respective conduit through which the loose fill insulation is carried. Third hose section 150 is coupled to second hose section 140 by a second connection module 170 that has a first side 171 attached to distal end 142 of second hose section 140 and a second side 172 attached to proximal end 151 of third hose section 150. Again, similar to first connection module 160 as shown in FIG. 3, second connection module 170 includes an interior surface with a conductive area that is electrically connected to grounding wire 122. While in loose fill insulation hose 120, third hose section 150 is downstream of second hose section 140, in other embodiments additional hose sections are position upstream of the first and second hose section. Furthermore, in some embodiments, hose sections are positioned both upstream and downstream of the first and second hose sections.

In certain embodiments of the loose fill insulation hose as otherwise described herein, the loose fill insulation hose further comprises a proximal connection module including a first side configured to attach to an outlet of a loose fill insulation blowing machine and a second side attached to the proximal end of the first hose section. The proximal connection module includes an interior surface with a conductive area that is electrically connected to the grounding wire. For example, loose fill insulation hose 120, shown in FIGS. 1 and 2, includes a proximal connection module 175 that has a first side 176 and a second side 177. The second side 177 of the proximal connection module 175 is attached to the proximal end 131 of first hose section 130 while the first end 176 of proximal connection module 175 is attached to an outlet 106 of loose fill insulation blowing machine 102.

Accordingly, proximal connection module 175 is at the proximal end of loose fill insulation hose 120 and receives the loose fill insulation as it leaves blowing machine 102.

Figure 4:
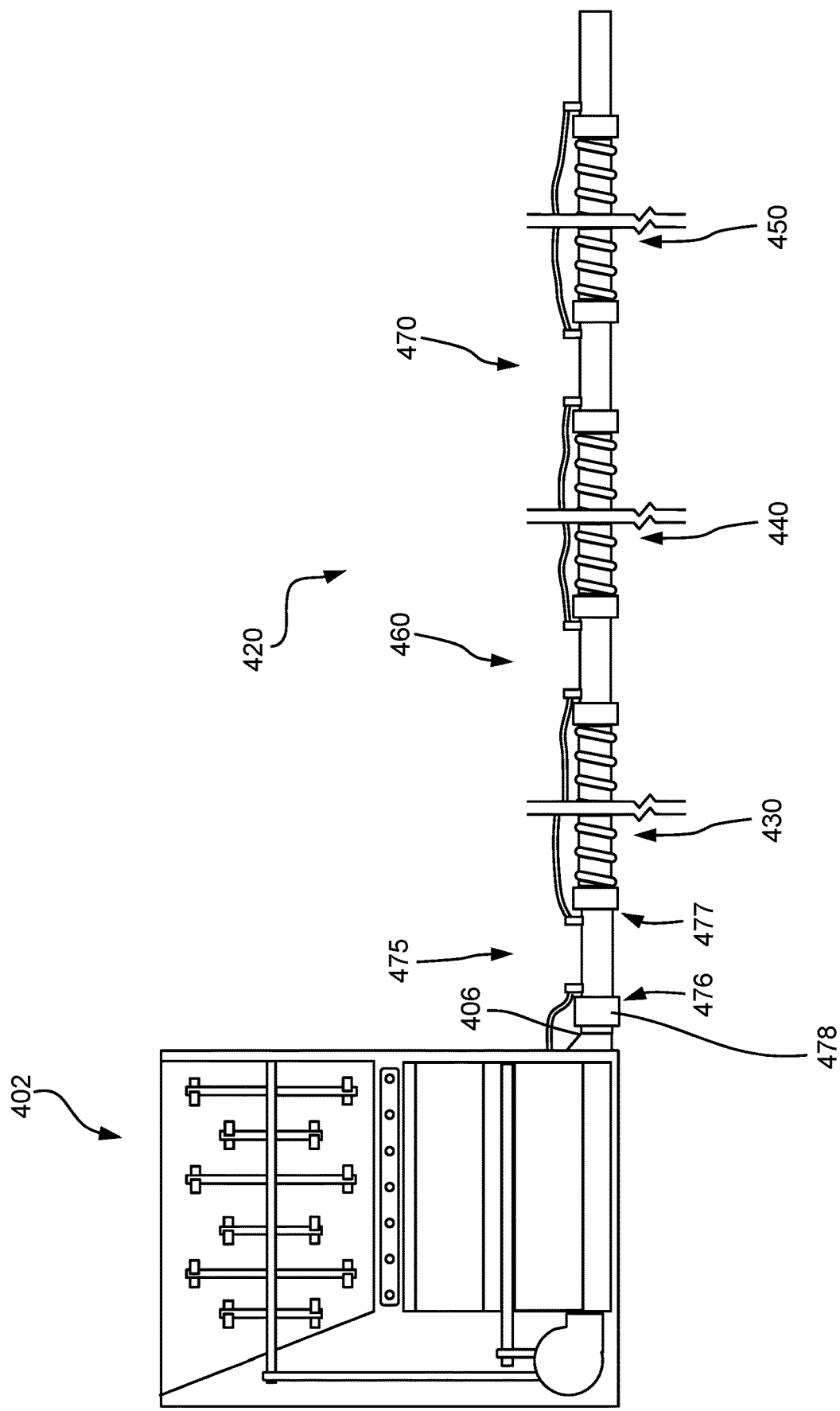
FIG. 4 is a schematic side view of a loose fill insulation system according to another embodiment of the disclosure.

Alternatively, in other embodiments, the loose fill insulation hose includes a proximal connection module and a coupler configured to attach to an outlet of the loose fill insulation blowing machine. In such an embodiment, a first side of the proximal connection module is attached to the coupler and a second side of the proximal connection module is attached to the proximal end of the first hose section. Again, the proximal connection module includes an interior surface with a conductive area that is electrically connected to the grounding wire. Such an embodiment is schematically shown in FIG. 4 as part of a loose fill insulation system. Loose fill insulation hose 420 includes first, second, and third hose sections 430, 440, 450 and first and second connection modules 460, 470, similar to those of loose fill insulation hose 120, shown in FIG. 1. Loose fill insulation hose 420 also includes a proximal connection module 475 that has a first side 476 and a second side 477. The second side 477 of proximal connection module 475 is coupled to a proximal end of first hose section 430, while the first side of proximal connection module 475 is also attached to a coupler 478 that is secured to the outlet 406 of loose fill insulation blowing machine 402.

In some embodiments, the coupler is used to enable the connection between the loose fill insulation hose and the outlet of the blowing machine. For example, in some embodiments, the coupler has two female couplings to receive male couplings on the blowing machine outlet and proximal connection module. In other embodiments, the coupler has two male couplings. In still yet other embodiments the coupler may contain one male and one female coupling on opposite ends. Further, in some embodiments, the coupling changes the diameter of the opening so that a hose and blowing machine outlet of different diameters can be connected.

Figure 5:
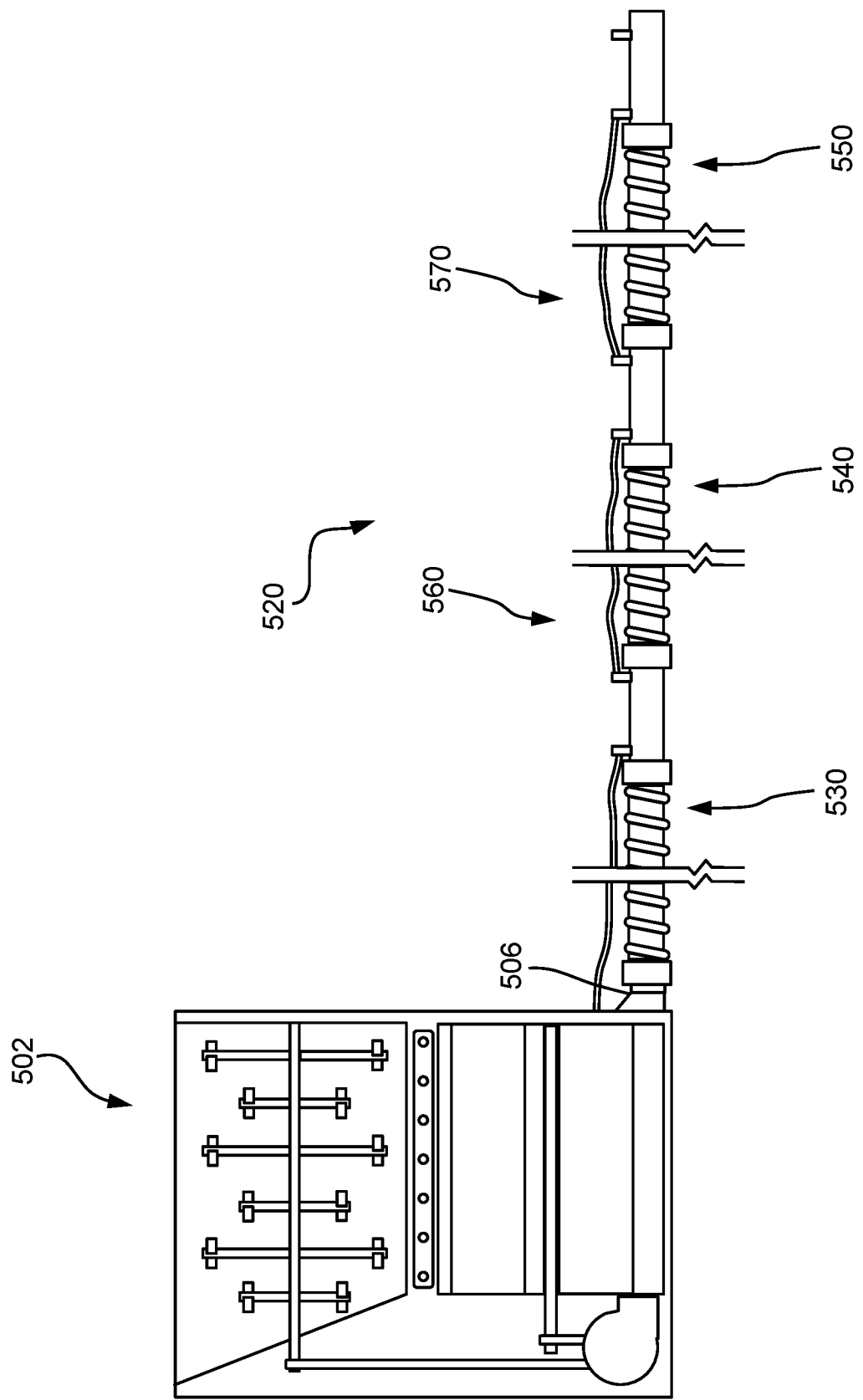
FIG. 5 is a schematic side view of a loose fill insulation system according to another embodiment of the disclosure.

In other embodiments the loose fill insulation hose does not include a proximal connection module. For example, in some embodiments, the one of the hose sections is either directly attached to the blowing machine outlet or is attached to the blowing machine outlet using a coupler. For example, such an embodiment is shown in FIG. 5 as part of a loose fill insulation system. Loose fill insulation hose 520 includes first, second, and third hose sections 530, 540, 550 and first and second connection modules 560, 570, similar to those of loose fill insulation hose 120, shown in FIG. 1. The first hose section 530 of loose fill insulation hose 520 is coupled directly to the outlet 506 of loose fill blowing machine 502.

In certain embodiments of the loose fill insulation hose as otherwise described herein, the first hose section and the second hose section are part of a group of hose sections that are connected in series, and the loose fill insulation hose further comprises a distal connection module attached at a distal end of the hose, where the distal connection module includes an interior surface that is electrically connected to the grounding wire, and where the distal connection module includes an interior surface with a conductive area that is electrically connected to the grounding wire. For example, loose fill insulation hose 120 shown in FIG. 1 includes a group of hose sections that includes first hose section 130, second hose section 140 and third hose section 150 connected in series. In other embodiments, the hose may include more than three hose sections, such as 4, 5, or more hose sections connected in series. At the distal end of loose fill insulation hose 120 is a distal connection module 180. Similar to the other connection modules 160, 170, and 175, distal connection module 180 includes an interior surface with a conductive area that is electrically connected to the grounding wire 122. Accordingly, loose fill insulation passing through the distal connection module can discharge static charge to the grounding wire 122 via the conductive area of the interior surface.

In other embodiments, the loose fill connection hose may include an outlet nozzle attached to the distal connection module. Still, in other embodiments, the loose fill insulation module may exclude a distal connection module. For example, in some embodiments, an outlet nozzle is connected directly to a hose section. Further, in other embodiments, the end of the hose is formed by a hose section, and neither a connection module nor an outlet nozzle is included at the end.

Each of the connection modules of loose fill insulation hose 120 have the same configuration. Accordingly, the first connection module 160 shown in FIG. 3 illustrates the features of the other connection modules of hose 120. In other embodiments, the connection modules have different configurations. For example, in some embodiments, the loose fill insulation hose includes a proximal connection module that is uniquely configured to attach to the blowing machine. Further, in some embodiments, the hose includes a distal connection module with an outlet nozzle that is not included in the other connection modules. In some embodiments, the hose includes some connection modules coupled to the grounding wire and other that are not connected to the grounding wire. Moreover, in some embodiments, some of the connection modules do not include a conductive area on an internal surface thereof.

In certain embodiments of the loose fill insulation hose as otherwise described herein, the first hose section and the second hose section are part of a group of hose sections that are connected in series, the first connection module is one of a group of connection modules, each connection module links a respective pair of the hose sections, the grounding wire is electrically connected to a conductive area of an interior surface of each connection module, and the grounding wire connects the connection modules in series. For example, in loose fill insulation hose 120, each of the connection modules 160, 170, 175, and 180 are connected in series along the grounding wire 122 that runs to loose fill insulation blowing machine 102. Moreover, a group of the connection modules including first connection module 160 and second connection module 170 each link a pair of the hose sections.

In certain embodiments of the loose fill insulation hose as otherwise described herein, the conductive area extends over the entire interior surface of the first connection module. For example, in some embodiments, the interior surface is entirely formed by a conductive material that extends from the first side of the connection module to the second side of the connection module. In other embodiment the conductive area is formed by one or more sections of the interior surface. For example, in some embodiments, a collar formed of a conductive material forms part of the interior surface of the connection module. Such a collar can be a solid tube, or have an open configuration, such as a mesh or screen. Other configurations of the conductive area are also possible, such as a conductive pad or strip that forms part of the interior surface.

In certain embodiments of the loose fill insulation hose as otherwise described herein, the conductive area of the interior surface is formed of a metal, e.g., steel, copper, aluminum, or iron. In other embodiments, the conductive area may be formed of a conductive plastic or other conductive material.

Figure 6:
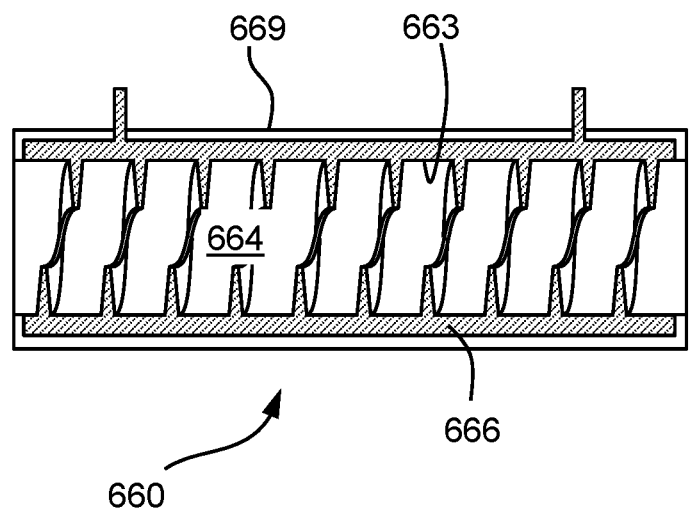
FIG. 6 is a schematic cross-sectional view of a portion of a loose fill insulation hose according to another embodiment of the disclosure.

In certain embodiments of the loose fill insulation hose as otherwise described herein, the first connection module is formed of metal. For example, in some embodiments, both the internal surface and the external surface of the first connection module is formed of metal. For example, as shown in FIG. 3, first connection module 160 of loose fill insulation hose 120 is formed entirely of metal such that both the internal and external surfaces are conductive. In other embodiments only a portion of the connection module is formed of metal. For example, in some embodiments, the interior surface of the connection module is formed of metal while the external surface is formed of a non-conductive material, such as a non-conductive plastic. Such an embodiment is shown in FIG. 6. Connection module 660 includes a metal interior 666 that forms the interior surface 663 and provides a conductive area for discharging static charge from insulation travelling along the path 664 within the connection module 660. Metal interior 666 is surrounded by a non-conductive plastic shell 669 that forms the exterior surface of connection module 660.

In certain embodiments of the loose fill insulation hose as otherwise described herein, the diameter of the interior surface of the first connection module is at least 1.5 inches, e.g., at least 2 inches, e.g., at least 2.5 inches. In some embodiments, the diameter of the interior surface of the first connection module is no more than 12 inches, e.g., no more than 10 inches, e.g., no more than 8 inches. For example, in some embodiments, the diameter of the interior surface of the first connection module is in a range from 1.5 inches to 12 inches, e.g., from 2.5 inches to 8 inches. Further, in some embodiments each of the connection modules has the same inner diameter. In other embodiments, some of the connection modules have different inner diameters.

In certain embodiments of the loose fill insulation hose as otherwise described herein, a length of the conductive area of the interior surface of the first connection module is at least 3 inches, e.g., at least 4 inches, e.g., at least 5 inches. In some embodiments, the length of the conductive area of the interior surface of the first connection module is no more than 24 inches, e.g., no more than 18 inches, e.g., no more than 12 inches. For example, in some embodiments, the length of the conductive area of the interior surface of the first connection module is in a range from 3 inches to 24 inches, e.g., from 4 inches to 18 inches, e.g., from 5 inches to 12 inches. As describe herein, the length of the conductive area is measured along the path through the connection module. Thus, for example, a conductive area that has a helical shape that repeatedly encircles the interior surface of the connection module and extends over six inches of the connection module has a "length" of six inches, and the length is not dependent on the trace of the helical shape.

In certain embodiments of the loose fill insulation hose as otherwise described herein, the first side of the first connection module is a male fitting that is inserted into the distal end of the first hose section, and the second side of the first connection module is a male fitting that is inserted into the proximal end of the second hose section. For example, as shown in FIG. 3, each of the first side 161 and second side 162 of first connection module 160 are formed as a male fitting that is inserted into the first hose section 130 and second hose section 140, respectively. In other embodiments, the first connection module includes female fittings and the hose sections include male fittings that are inserted into the connection module. Further, in some embodiments, the first connection module includes a male fitting on one side and a female fitting on the other side. Such a configuration allows connection between two adjacent connection modules without an intervening hose section or coupler.

In certain embodiments of the loose fill insulation hose as otherwise described herein, the first connection module includes projections extending inward into the path between the first hose section and the second hose section. The projections are configured to open the loose fill insulation. As air flowing through the hose carries the loose fill insulation through the connection module, fibers or particles of the loose fill insulation may catch on the projections of the connection module and be pulled open or apart. For example, as shown in FIG. 3, first connection module 160 includes projections 167 along the length of first connection module 160. Projections 167 form part of interior surface 163 and extend into path 164 so as to interact with loose fill insulation passing through the connection module.

In certain embodiments of the loose fill insulation hose as otherwise described herein, the projections are connected on a helical path. For example, the projections 167 of first connection module 160, as shown in FIG. 3, are formed by a continuous projecting structure that extends around the circumference of the interior surface 163 in a helix along the length of first connection module 160. Accordingly, this single continuous structure forms a plurality of projections into the path 164 of the first connection module 160 along its length. In other embodiments, the projections may be formed by continuous structures having other shapes. Further, in some embodiments, the projections are formed by discrete structures that individually extend inward into the path along the length of the connection module.

In certain embodiments of the loose fill insulation hose as otherwise described herein, a surface of the projections is conductive, and the conductive surface of the projections is electrically connected to the grounding wire. For example, in first connection module 160, the projections 167 are formed of metal, like the rest of the connection module 160. According the surface of the projections 167 is conductive and is electrically connected to grounding wire 122. In other embodiments, one or more of the projections is not conductive. For example, in some embodiments the projections are formed of a non-conductive plastic, and the conductive area of the interior surface of the connection module is formed by another part of the connection module.

Figure 7:
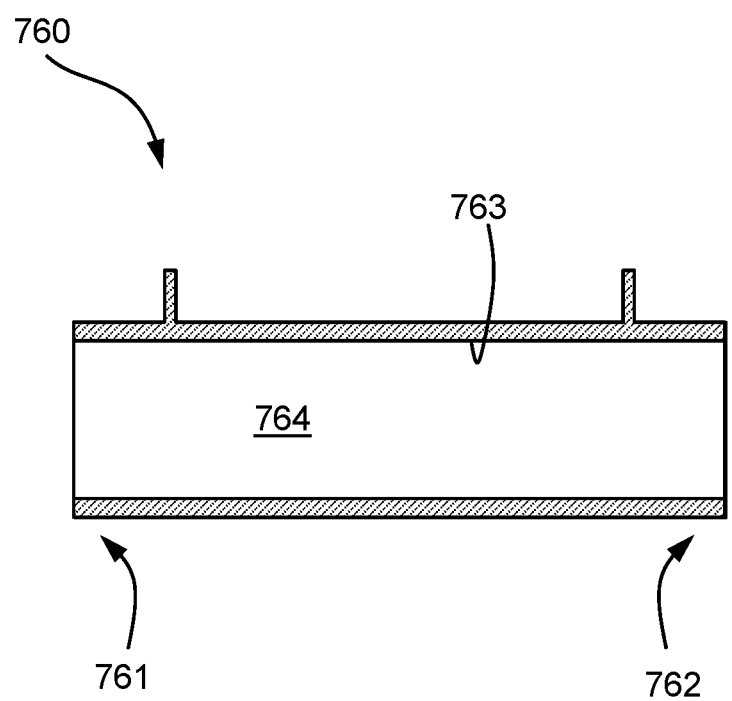
FIG. 7 is a schematic cross-sectional view of a portion of a loose fill insulation hose according to another embodiment of the disclosure.

In other embodiments, the first connection module does not include any projections extending into the path that runs through the module. Such an embodiment is shown in FIG. 7. First connection module 760 includes a first end 761 and second end 762 that are configured to couple to respective hose sections. Moreover, first connection module 760 includes a smooth interior surface 763 that extends along the length of the first connection module 760. Thus, first connection module 760 has a consistent diameter, and does not include any projections that extend into the path 764 provided for loose fill insulation to be carried through the module.

In certain embodiments of the loose fill insulation hose as otherwise described herein, the first hose section is corrugated. For example, first hose section 130 of loose fill insulation hose 120, as shown in FIGS. 1-3, has a corrugated tubular body 133. Corrugated hose can have increased flexibility and strength compared to similar hose with a smooth outer surface. The other hose sections of loose fill insulation hose 120 are similarly corrugated, as shown in FIG. 1.

In some embodiments, the grounding wire is separate from the hose sections and extends between the connection modules in parallel with the hose sections. For example, grounding wire 122 of loose fill insulation hose 120 runs alongside the hose sections and connects independently to the first connection module 130 and second connection module 140. In certain embodiments of the loose fill insulation hose as otherwise described herein, the grounding wire is part of the structure of the first hose section. For example, in some embodiments, the grounding wire is secured to or forms part of the outside surface of the hose sections.

Alternatively, in certain embodiments of the loose fill insulation hose as otherwise described herein, the grounding wire is embedded in the first hose section. For example, in some embodiments, the grounding wire is embedded between the internal surface and the external surface of the hose sections, so that it is electrically isolated from both the interior of the hose section and is insulated from the area surrounding the hose section.

Figure 8:
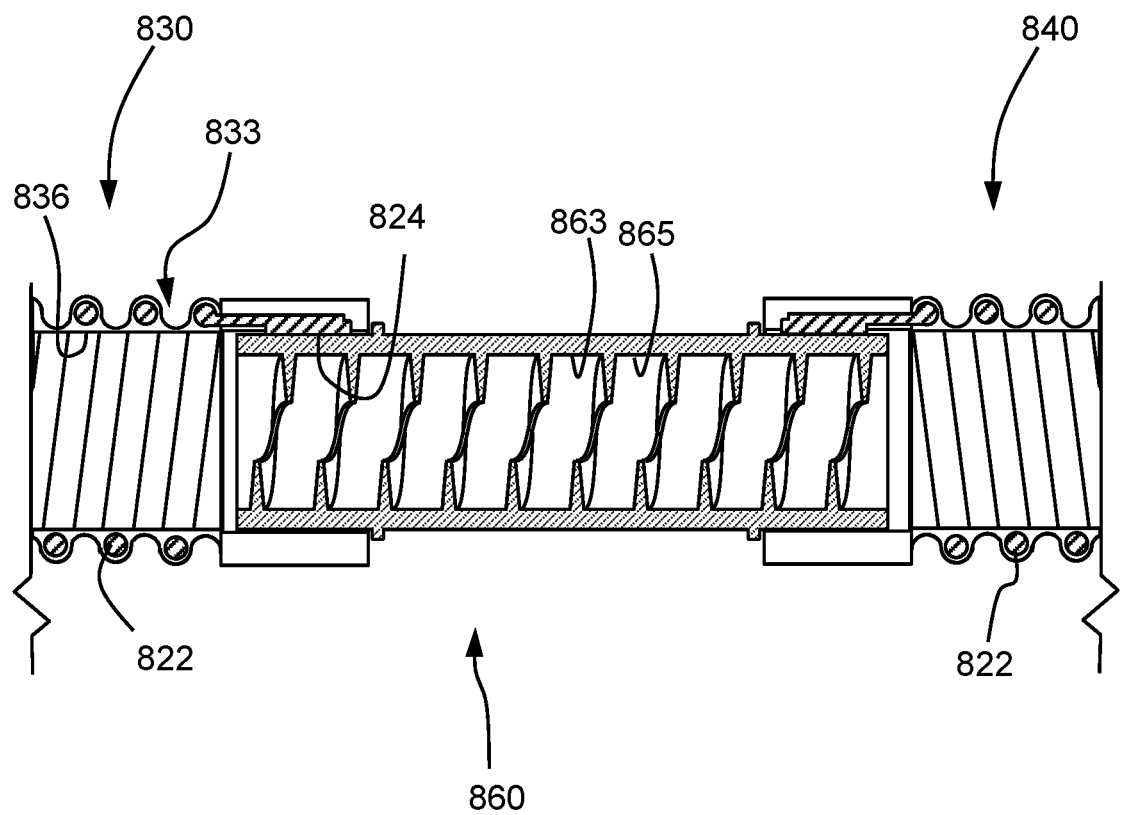
FIG. 8 is a schematic cross-sectional view of a portion of a loose fill insulation hose according to another embodiment of the disclosure.

Further, in certain embodiments of the loose fill insulation hose as otherwise described herein, the grounding wire forms a structural support of the first hose section. Such an embodiment is shown in FIG. 8, which includes portions of first and second hose sections 830, 840 coupled to a first connection module 860. Each of the first hose section 830 and second hose section 840 includes a structural support 822 within the outer wall of the hose section that forms the grounding wire. In particular, the structural support 822 is formed of a metal coil that provides both a conductive path through the hose and a support for the tubular body. Moreover, the structural support 822 that forms the grounding wire is embedded in the wall of the tubular body 833 such that it is isolated from the internal surface 836 of the tubular body 833.

In certain embodiments of the loose fill insulation hose as otherwise described herein, the grounding wire extends helically through the first hose section. For example, the structural support 822 that forms the grounding wire through first hose section 830 winds around the corrugated wall of the tubular body 833

In certain embodiments of the loose fill insulation hose as otherwise described herein, the distal end of the first hose section includes an electrical contact surface that is electrically connected to the grounding wire, and the electrical contact surface is configured to provide a connection with the conductive area of the interior surface of the first connection module. For example, first hose section 830, shown in FIG. 8 includes an electrical contact surface 824 that is coupled to the grounding wire 822 embedded in outer wall of tubular body 833. The electrical contact surface 824 provides a connection between grounding wire 822 and the outer surface of connection module 860. Because connection module 860 is formed of metal, the contact between electrical contact surface 824 and the outer surface of connection module 860 provides a conductive path from the grounding wire 822 to conductive area 865 of interior surface 863 of connection module 860. In other embodiments, where the connection module is not entirely conductive, the connection module may include a corresponding contact surface configured to engage the electrical contact surface of the first hose section.

In first hose 830, the electrical contact surface 824 is formed as a pad on the internal surface of the end fitting. In other embodiments, the electrical contact surface may have another configuration. For example, in some embodiments, the electrical contact surface is formed as a collar around the internal surface of the end of the first hose section. In other embodiments, the electrical contact surface may have another shape configured to contact a conductive portion of the connection module.

In certain embodiments of the loose fill insulation hose as otherwise described herein, the first connection module includes an exterior tab electrically connected to the conductive area of the interior surface, and the exterior tab is attached to the grounding wire. For example, as shown in FIG. 3, first connection module 160 includes two exterior tabs 168 that are electrically connected to conductive area 165 of interior surface 163. Each of these exterior tabs 168 is coupled to portions of grounding wire 122. In other embodiments, the connection modules may include a single exterior tab that is coupled to the grounding wire.

In some embodiments, the connections modules of the loose fill insulation hose are connected in series along a single grounding wire. For example, in loose fill insulation hose 120, as shown in FIG. 1, the connection modules are connected in series along grounding wire 122, which extends to loose fill blowing machine 102, where the grounding wire is grounded. In other embodiments, different connection modules of loose fill insulation hose may be attached to different grounding wires. For example, in some embodiments, one or more connection modules at the proximal end of the hose may be coupled to a grounding wire connected to the blowing machine, while connection modules at distal end of the hose may be coupled to a grounding wire connected to an electrical ground at another location.

In certain embodiments of the loose fill insulation hose as otherwise described herein, the first hose section has a length of at least 10 feet, e.g., at least 15 feet, e.g., at least 20 feet. In some embodiments, the first hose section has a length of no more than 100 feet, e.g., no more than 80 feet, e.g., no more than 60 feet, e.g., about 50 feet. For example, in some embodiments, the first hose section has a length in a range from 10 feet to 100 feet, e.g., from 12 feet to 80 feet, e.g., from 15 feet to 60 feet, e.g., from 20 feet to 50 feet. In some embodiments each of the hose sections has the same length. In other embodiments the hose sections of the loose fill insulation hose have different lengths.

In certain embodiments of the loose fill insulation hose as otherwise described herein, an inner diameter of the first hose section is at least 1.5 inches, e.g., at least 2 inches, e.g., at least 2.5 inches. In certain embodiments of the loose fill insulation hose as otherwise described herein, an inner diameter of the first hose section is no more than 12 inches, no more than 10 inches, no more than 8 inches. For example, in some embodiments, the inner diameter of the first hose section is in a range from 1.5 inches to 12 inches, e.g. from 2 inches to 10 inches, e.g., from 2.5 inches to 8 inches. Further, in some embodiments each of the hose sections has the same inner diameter. In other embodiments, some of the hose sections have different inner diameters.

In another aspect, the disclosure provides a system for delivering loose fill insulation that includes a loose fill insulation blowing machine and the loose fill insulation hose of the disclosure. The blowing machine includes a hopper configured to receive loose fill insulation, an outlet, and a blower operable to expel loose fill insulation through the outlet. The loose fill insulation hose is attached to the outlet of the loose fill insulation blowing machine.

Such a system is schematically shown in FIGS. 1 and 2. Loose fill insulation system 100 includes a blowing machine coupled to loose fill insulation hose 120, which is described in detail above. Loose fill insulation blowing machine 102 includes a hopper 104 configured to receive insulation.

Blowing machine 102 conditions the insulation, which is then delivered to hose 120 through outlet 106 through the use of a blower 108. The blower 108 circulates air through blowing machine 102 to carry the loose fill insulation through hose 120 to an installation site at the distal end of the hose.

In certain embodiments of the system of the disclosure, the hopper includes a shredder box configured to break apart the loose fill insulation. For example, hopper 104 includes a shredder box 110 including a plurality of shredding members that rotate through the packed insulation to break the insulation apart and "open" the insulation.

In certain embodiments of the system of the disclosure, the loose fill insulation blowing machine includes an air lock configured to transfer the loose fill insulation to the outlet. For example, the insulation in system 100 moves from the shredder box 110 through a stator bar 112 that includes tines for further opening the insulation and into an air lock 114. As shown in FIG. 2, the air lock 114 includes a plurality of sealed vanes 116 (see FIG. 2) that rotate around a drum and transport the insulation to an area where the air flow from blower 108 carries the insulation through outlet 106. The air lock 114 directs the air flow out through the outlet 106 rather than back into the shredder box 110.

In certain embodiments of the system of the disclosure, the grounding wire of the loose fill insulation hose is coupled to the loose fill insulation blowing machine. For example, grounding wire 122 of loose fill insulation system 100 is coupled to blowing machine 102. Accordingly, the charge on the grounding wire 122 can be discharged to a ground associated with the blowing machine, for example, via an electrical connection of the blowing machine. In other embodiments, the grounding wire 122 may be connected to another electrical ground, such as a grounded structure or another electrical system.

In another aspect, the disclosure provides a method of delivering loose fill insulation to an installation site using the system of the disclosure. The method includes expelling loose fill insulation from a blowing machine into the loose fill insulation hose. The loose fill insulation is conveyed through the loose fill insulation hose to the installation site. Within the hose, static is discharged from the loose fill insulation passing through the first connection module via the grounding wire.

Such a method is depicted in FIG. 1. Packed insulation 190 is initially introduced into blowing machine 102 via the hopper 104. The packed insulation 190 is broken up and opened by the shredder box 110 and stator bar 112 as it moves into air lock 114. The air lock 114 then moves the insulation to a position where air from blower 108 can carry the insulation through hose 120 to an installation site at the distal end of hose 120, where the loose fill insulation 192 is delivered to the installation site. As the insulation passes through hose 120, any charge that builds up in the insulation can be discharged to grounding wire 122 through the connection modules 160, 170, 175, 180, as described above.

In certain embodiments of the method as otherwise described herein, the method further includes opening the loose fill insulation that is passing through the first connection module using projections extending inward into the path between the first hose section and the second hose section. For example, as the loose fill insulation in system 100 passes through first connection module 160, the projections 167 interact with the insulation and further open the insulation, as explained in more detail above.

In certain embodiments of the method as otherwise described herein, the loose fill insulation includes a fibrous material. For example, in some embodiments, the loose fill insulation is a fiberglass insulation, a cellulose insulation, a stonewool insulation, a plastic fiber insulation, a natural wool insulation, a natural cotton insulation, or another insulation including fibers. In other embodiments, the loose fill insulation includes small insulating components, such as a foam bead insulation or a plastic particle insulation. Still, in other embodiments, the loose fill insulation may be formed of another type of insulation that can build electric static potential as it passes through the loose fill insulation hose.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

Embodiments

Embodiment 1. A loose fill insulation hose comprising:
    a first hose section including a proximal end and a distal end, the first hose section comprising a first tubular body extending from the proximal end to the distal end and having an internal surface surrounding a first conduit and an external surface;
    a second hose section including a proximal end and a distal end, the second hose section comprising a second tubular body extending from the proximal end to the distal end and having an internal surface surrounding a second conduit and an external surface;
    a first connection module including a first side attached to the distal end of the first hose section and a second side attached to the proximal end of the second hose section, the first connection module including an interior surface surrounding a path that connects the first conduit of the first hose section to the second conduit of the second hose section, the interior surface including a conductive area; and
    a grounding wire electrically connected to the conductive area of the interior surface of the first connection module, wherein the internal surface of the first tubular body is electrically isolated from the grounding wire along the length of the first hose section, and wherein the internal surface of the second tubular body is electrically isolated from the grounding wire along the length of the second hose section.

Embodiment 2. The loose fill insulation hose according to embodiment 1, further comprising:
    a third hose section including a proximal end and a distal end, the third hose section comprising a third tubular body extending from the proximal end to the distal end and having an internal surface surrounding a third conduit and an external surface; and
    a second connection module including a first side attached to the distal end of the second hose section and a second side attached to the proximal end of the third hose section, the second connection module including an interior surface surrounding a path that connects the second conduit of the second hose section to the third conduit of the third hose section, the interior surface including a conductive area,
    wherein the grounding wire is electrically connected to the conductive area of the interior surface of the second connection module.

Embodiment 3. The loose fill insulation hose according to embodiment 1 or embodiment 2, further comprising a proximal connection module including a first side configured to attach to an outlet of a loose fill insulation blowing machine and a second side attached to the proximal end of the first hose section,
  wherein the proximal connection module includes an interior surface with a conductive area that is electrically connected to the grounding wire.

Embodiment 4. The loose fill insulation hose according to embodiment 1 or embodiment 2, further comprising a proximal connection module including a first side attached to a coupler configured to attach to an outlet of a loose fill insulation blowing machine and a second side attached to the proximal end of the first hose section,
  wherein the proximal connection module includes an interior surface with a conductive area that is electrically connected to the grounding wire.

Embodiment 5. The loose fill insulation hose according to any of embodiments 1 to 5, wherein the first hose section and the second hose section are part of a group of hose sections that are connected in series, and further comprising a distal connection module attached at a distal end of the hose, the distal connection module including an interior surface that is electrically connected to the grounding wire,
  wherein the distal connection module includes an interior surface with a conductive area that is electrically connected to the grounding wire.

Embodiment 6. The loose fill insulation hose according to any of embodiments 1 to 5, wherein the first hose section and the second hose section are part of a group of hose sections that are connected in series,
  wherein the first connection module is one of a group of connection modules,
  wherein each connection module links a respective pair of the hose sections,
  wherein the grounding wire is electrically connected to a conductive area of an interior surface of each connection module, and
  wherein the grounding wire connects the connection modules in series.

Embodiment 7. The loose fill insulation hose according to any of embodiments 1 to 6, wherein the conductive area extends over the entire interior surface of the first connection module.

Embodiment 8. The loose fill insulation hose according to any of embodiments 1 to 7, wherein the conductive area of the interior surface is formed of a metal, e.g., steel, copper, aluminum, or iron.

Embodiment 9. The loose fill insulation hose according to any of embodiments 1 to 8, wherein the first connection module is formed of metal.

Embodiment 10. The loose fill insulation hose according to any of embodiments 1 to 9, wherein the diameter of the interior surface of the first connection module is at least 1.5 inches, e.g., at least 2 inches, e.g., at least 2.5 inches.

Embodiment 11. The loose fill insulation hose according to any of embodiments 1 to 10, wherein the diameter of the interior surface of the first connection module is no more than 12 inches, e.g., no more than 10 inches, e.g., no more than 8 inches.

Embodiment 12. The loose fill insulation hose according to any of embodiments 1 to 11, wherein a length of the conductive area of the interior surface of the first connection module is at least 3 inches, e.g., at least 4 inches, e.g., at least 5 inches.

Embodiment 13. The loose fill insulation hose according to any of embodiments 1 to 12, wherein a length of the conductive area of the interior surface of the first connection module is no more than 24 inches, e.g., no more than 18 inches, e.g., no more than 12 inches.

Embodiment 14. The loose fill insulation hose according to any of embodiments 1 to 13, wherein the first side of the first connection module is a male fitting that is inserted into the distal end of the first hose section, and wherein the second side of the first connection module is a male fitting that is inserted into the proximal end of the second hose section.

Embodiment 15. The loose fill insulation hose according to any of embodiments 1 to 14, wherein the first connection module includes projections extending inward into the path between the first hose section and the second hose section, the projections being configured to open the loose fill insulation.

Embodiment 16. The loose fill insulation hose according to embodiment 15, wherein the projections are connected on a helical path.

Embodiment 17. The loose fill insulation hose according to embodiment 15 or embodiment 16, wherein a surface of the projections is conductive, and wherein the conductive surface of the projections is electrically connected to the grounding wire.

Embodiment 18. The loose fill insulation hose according to any of embodiments 1 to 17, wherein the first hose section is corrugated.

Embodiment 19. The loose fill insulation hose according to any of embodiments 1 to 18, wherein the grounding wire is part of the structure of the first hose section.

Embodiment 20. The loose fill insulation hose according to embodiment 19, wherein the grounding wire is embedded in the first hose section.

Embodiment 21. The loose fill insulation hose according to embodiment 19 or embodiment 20, wherein the grounding wire forms a structural support of the first hose section.

Embodiment 22. The loose fill insulation hose according to any of embodiments 19 to 21, wherein the grounding wire extends helically through the first hose section.

Embodiment 23. The loose fill insulation hose according to any of embodiments 19 to 22, wherein the distal end of the first hose section includes an electrical contact surface that is electrically connected to the grounding wire, and wherein the electrical contact surface is configured to provide a connection with the conductive area of the interior surface of the first connection module.

Embodiment 24. The loose fill insulation hose according to any of embodiments 1 to 18, wherein the first connection module includes an exterior tab electrically connected to the conductive area of the interior surface, and wherein the exterior tab is attached to the grounding wire.

Embodiment 25. The loose fill insulation hose according to any of embodiments 1 to 24, wherein the first hose section has a length of at least 10 feet, e.g., at least 15 feet, e.g., at least 20 feet.

Embodiment 26. The loose fill insulation hose according to any of embodiments 1 to 24, wherein the first hose section has a length of no more than 100 feet, e.g., no more than 80 feet, e.g., no more than 60 feet, e.g., about 50 feet.

Embodiment 27. The loose fill insulation hose according to any of embodiments 1 to 26, wherein an inner diameter of the first hose section is at least 1.5. inches, e.g., at least 2 inches, e.g., at least 2.5 inches.

Embodiment 28. The loose fill insulation hose according to any of embodiments 1 to 27, wherein an inner diameter of the first hose section is no more than 12 inches, e.g., no more than 10 inches, e.g., no more than 8 inches.

Embodiment 29. A system for delivering loose fill insulation, the system comprising:
a loose fill insulation blowing machine comprising:
a hopper configured to receive loose fill insulation,
an outlet, and
a blower operable to expel loose fill insulation through the outlet; and
a loose fill insulation hose according to any of embodiments 1 to 28 attached to the outlet of the loose fill insulation blowing machine.

Embodiment 30. The system according to embodiment 29, wherein the hopper includes a shredder box configured to break apart the loose fill insulation.

Embodiment 31. The system according to embodiment 29 or embodiment 30, wherein the loose fill insulation blowing machine includes an air lock configured to transfer the loose fill insulation to the outlet.

Embodiment 32. The system according to any of embodiments 29 to 31, wherein the grounding wire of the loose fill insulation hose is coupled to the loose fill insulation blowing machine.

Embodiment 33. A method of delivering loose fill insulation to an installation site using the system according to any of embodiments 29 to 32, the method comprising:
expelling loose fill insulation from a blowing machine into the loose fill insulation hose;
conveying the loose fill insulation through the loose fill insulation hose to the installation site; and
discharging static charge from loose fill insulation passing through the first connection module via the grounding wire.

Embodiment 34. The method according to embodiment 33, further comprising opening the loose fill insulation passing through the first connection module using projections extending inward into the path between the first hose section and the second hose section.

What is claimed is:

1. A loose fill insulation hose comprising:
a first hose section including a proximal end and a distal end, the first hose section comprising a first tubular body extending from the proximal end to the distal end and having an internal surface surrounding a first conduit and an external surface;
a second hose section including a proximal end and a distal end, the second hose section comprising a second tubular body extending from the proximal end to the distal end and having an internal surface surrounding a second conduit and an external surface;
a first connection module including a first side attached to the distal end of the first hose section and a second side attached to the proximal end of the second hose section, the first connection module including an interior surface surrounding a path that connects the first conduit of the first hose section to the second conduit of the second hose section, the interior surface including a conductive area; and
a grounding wire electrically connected to the conductive area of the interior surface of the first connection module, wherein the internal surface of the first tubular body is electrically isolated from the grounding wire along the length of the first hose section, and wherein the internal surface of the second tubular body is electrically isolated from the grounding wire along the length of the second hose section.

2. The loose fill insulation hose according to claim 1, further comprising:
a third hose section including a proximal end and a distal end, the third hose section comprising a third tubular body extending from the proximal end to the distal end and having an internal surface surrounding a third conduit and an external surface; and
a second connection module including a first side attached to the distal end of the second hose section and a second side attached to the proximal end of the third hose section, the second connection module including an interior surface surrounding a path that connects the second conduit of the second hose section to the third conduit of the third hose section, the interior surface including a conductive area,
wherein the grounding wire is electrically connected to the conductive area of the interior surface of the second connection module.

3. The loose fill insulation hose according to claim 1, further comprising a proximal connection module including a first side configured to attach to an outlet of a loose fill insulation blowing machine and a second side attached to the proximal end of the first hose section,
wherein the proximal connection module includes an interior surface with a conductive area that is electrically connected to the grounding wire.

4. The loose fill insulation hose according to claim 1, further comprising a proximal connection module including a first side attached to a coupler configured to attach to an outlet of a loose fill insulation blowing machine and a second side attached to the proximal end of the first hose section,
wherein the proximal connection module includes an interior surface with a conductive area that is electrically connected to the grounding wire.

5. The loose fill insulation hose according to claim 1, wherein the first hose section and the second hose section are part of a group of hose sections that are connected in series, and further comprising a distal connection module attached at a distal end of the hose, the distal connection module including an interior surface that is electrically connected to the grounding wire,
wherein the distal connection module includes an interior surface with a conductive area that is electrically connected to the grounding wire.

6. The loose fill insulation hose according to claim 1, wherein the first hose section and the second hose section are part of a group of hose sections that are connected in series,
wherein the first connection module is one of a group of connection modules,
wherein each connection module links a respective pair of the hose sections,
wherein the grounding wire is electrically connected to a conductive area of an interior surface of each connection module, and
wherein the grounding wire connects the connection modules in series.

7. The loose fill insulation hose according to claim 1, wherein the conductive area extends over the entire interior surface of the first connection module.

8. The loose fill insulation hose according to claim 7, wherein the first connection module is formed of metal.

9. The loose fill insulation hose according to claim 1, wherein the first connection module includes projections extending inward into the path between the first hose section and the second hose section, the projections being configured to open the loose fill insulation.

10. The loose fill insulation hose according to claim 9, wherein the projections are connected on a helical path.

11. The loose fill insulation hose according to claim 1, wherein the grounding wire is part of the structure of the first hose section and is embedded in the first hose section.

12. The loose fill insulation hose according to claim 11, wherein the distal end of the first hose section includes an electrical contact surface that is electrically connected to the grounding wire, and wherein the electrical contact surface is configured to provide a connection with the conductive area of the interior surface of the first connection module.

13. A system for delivering loose fill insulation, the system comprising:
   a loose fill insulation blowing machine comprising:
      a hopper configured to receive loose fill insulation,
      an outlet, and
      a blower operable to expel loose fill insulation through the outlet; and
   a loose fill insulation hose according to claim 1 attached to the outlet of the loose fill insulation blowing machine.

14. The system according to claim 13, wherein the grounding wire of the loose fill insulation hose is coupled to the loose fill insulation blowing machine.

15. A method of delivering loose fill insulation to an installation site using the system according to claim 13, the method comprising:
   expelling loose fill insulation from a blowing machine into the loose fill insulation hose;
   conveying the loose fill insulation through the loose fill insulation hose to the installation site; and
   discharging static charge from loose fill insulation passing through the first connection module via the grounding wire.

16. The method according to claim 15, further comprising opening the loose fill insulation passing through the first connection module using projections extending inward into the path between the first hose section and the second hose section.

* * * * *